United States Patent [19]

Higgins et al.

[11] Patent Number: 5,003,868
[45] Date of Patent: Apr. 2, 1991

[54] FOOD PROCESSING APPARATUS

[75] Inventors: John Higgins, Ennis; Michael McDonagh, Cratloe, both of Ireland

[73] Assignee: Alperk Limited, Shannon, Ireland

[21] Appl. No.: 513,499

[22] Filed: Apr. 26, 1990

[30] Foreign Application Priority Data

May 1, 1989 [IE] Ireland ................................ 650/89
May 1, 1989 [IE] Ireland ................................ 652/89
May 1, 1989 [IE] Ireland ................................ 653/89

[51] Int. Cl.$^5$ ...................... A47J 37/00; A47J 37/12
[52] U.S. Cl. ........................................ 99/357; 99/407; 99/408; 99/409
[58] Field of Search ................. 99/330, 331, 357, 403, 99/404, 407-410, 477-479, 443 C, 484; 426/523, 438; 221/150 A, 150 HC, 150 R; 210/DIG. 8

[56] References Cited

U.S. PATENT DOCUMENTS

| | | | |
|---|---|---|---|
| 1,610,564 | 12/1926 | McLaughlin | 99/407 |
| 2,731,905 | 1/1956 | Morgan et al. | 99/407 |
| 3,614,924 | 10/1971 | Hickey | 99/407 |
| 4,001,451 | 1/1977 | Veeneman et al. | 426/438 |
| 4,478,140 | 10/1984 | Bullock | 99/330 |
| 4,722,267 | 2/1988 | Galockin et al. | 99/357 |
| 4,748,902 | 6/1988 | Maurantonio | 99/443 C |
| 4,813,572 | 3/1989 | Schmidt | 221/150 HC |
| 4,821,633 | 4/1989 | Ripatonda | 99/403 |
| 4,838,455 | 6/1989 | Hoeberigs | 221/150 A |
| 4,945,826 | 8/1990 | Ripatonda | 99/357 |

Primary Examiner—Timothy F. Simone
Attorney, Agent, or Firm—Foley & Lardner

[57] ABSTRACT

A food processing apparatus is disclosed. The apparatus has a refrigerated compartment with a batch dispensing system for delivery of batches of frozen food to a cooking compartment. The cooking compartment has a deep-fry cooking chamber which has a basket and an integral chute which extends between the walls of the cooking chamber to form a barrier between the oil and the discharge outlet for sealing of the chamber. An analogue transducer monitors the position of the basket so that the continuous control may be achieved via a microprocessor control unit. Thus, control of cooking times, drain times, and movement of the basket is readily achieved by suitable setting of a control unit.

10 Claims, 4 Drawing Sheets

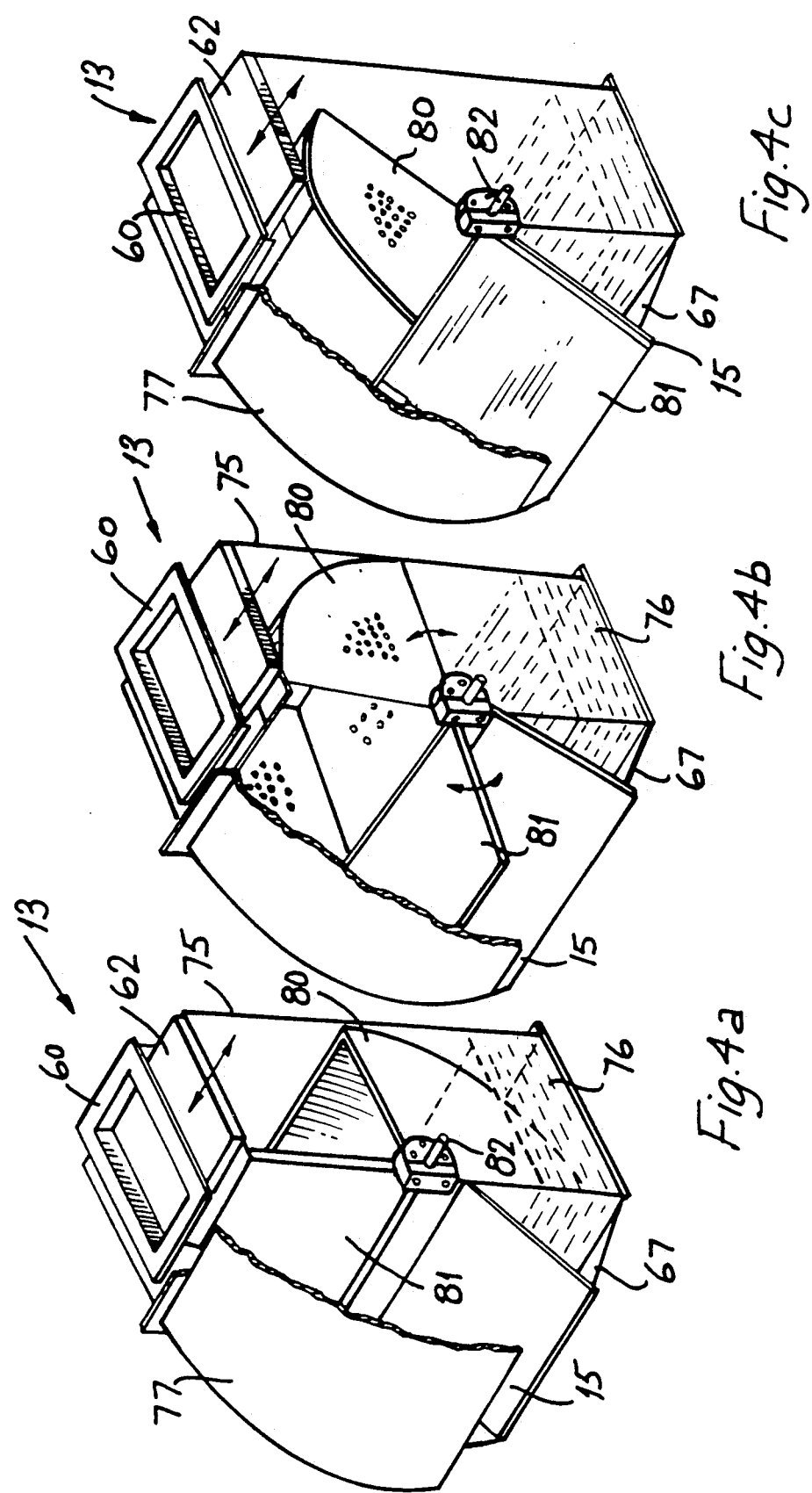

FOOD PROCESSING APPARATUS

BACKGROUND OF THE INVENTION

1. Field of the Invention

The invention relates to processing of food. More particularly, the invention relates to cooking by deep frying and automatic dispensing of food such as french fries, chicken pieces or scampi.

2. Related Prior Art

Presently available apparatus of this type suffer from the considerable disadvantages that excessive fumes, odour and unhygienic surface deposits are generated, in use. A further problem is that there is insufficient control of the handling and cooking of food, especially if the apparatus is to be used for different types of food.

The present invention is directed towards providing an improved food processing apparatus to overcome these problems.

SUMMARY OF THE INVENTION

According to the invention there is provided a food processing apparatus comprising:
- a central control unit;
- a refrigerated compartment including a batch dispensing system operatively connected to the control unit for automatic dispensing of batches of food from the refrigerated compartment;
- a cooking compartment including a deep-fry cooking chamber comprising:
  - a casing;
  - an oil heating means;
  - a reception opening in the casing for reception of batches of frozen food from the refrigerated compartment;
  - door means operated by a drive means operatively connected to the control unit for covering the reception opening except when a batch of food is being received;
  - a food basket mounted in the casing;
  - drive means for moving the basket between a cooking position in which at least portion of the basket is immersed in oil for cooking and a discharge position for delivery of food from the basket through a discharge outlet in the casing;
  - barrier means for the discharge outlet in the casing, the barrier means being movable from a closed position for substantially sealing the casing discharge outlet during cooking and an open position to allow discharge of food from the basket through the casing discharge outlet when the basket is in the discharge position; and
- a container dispensing mechanism operatively connected to the control unit for automatically dispensing a container for reception of the discharged cooked food.

BRIEF DESCRIPTION OF THE DRAWINGS

The invention will be more clearly understood from the following description of some preferred embodiments thereof, given by way of example only with reference to the accompanying drawings in which:

FIGS. 4(a) to 4(c) are perspective, partly cut-away views of a cooking chamber in different positions.

DESCRIPTION OF PREFERRED EMBODIMENTS

Figure 1:
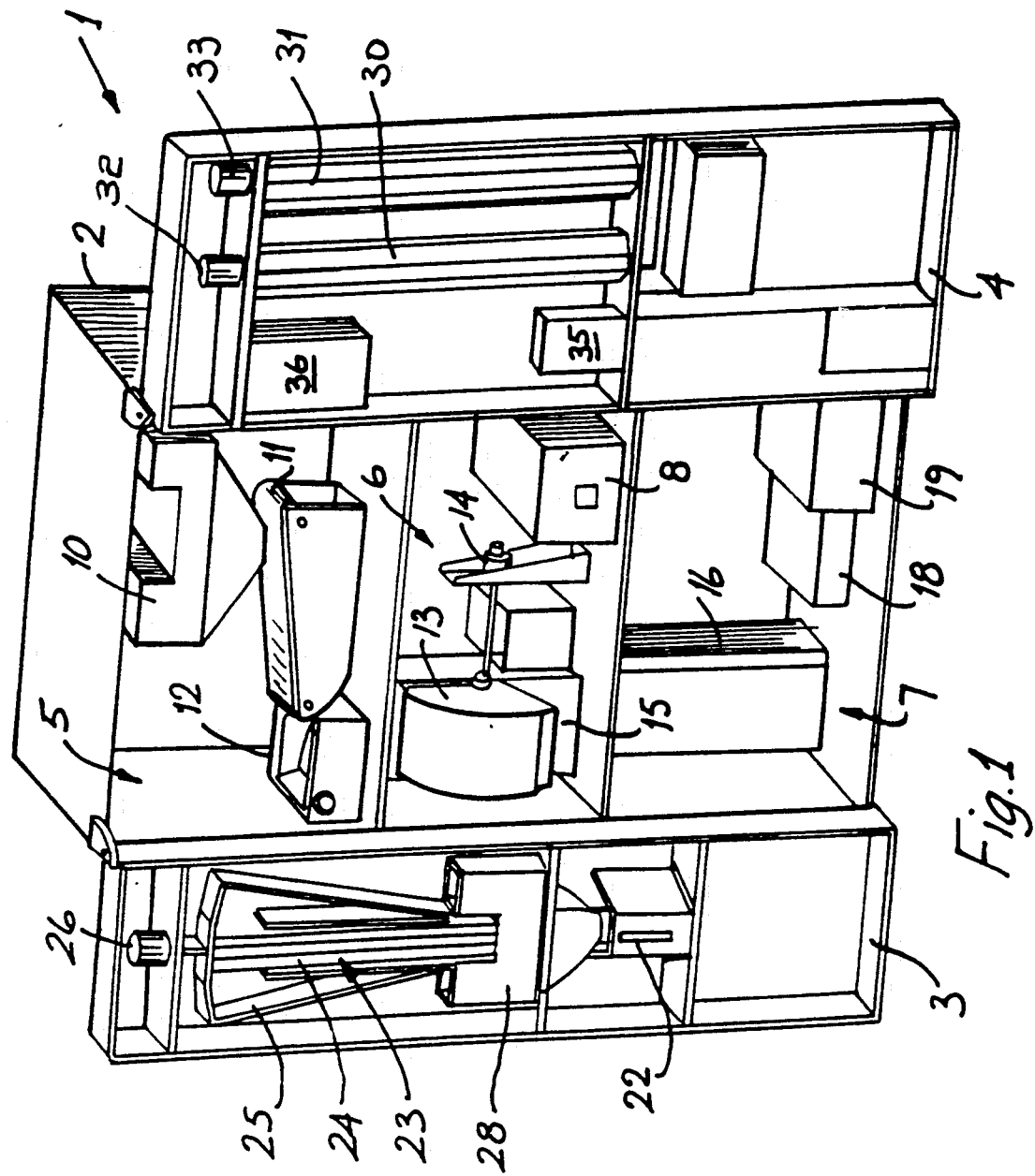
FIG. 1 is a perspective diagrammatic view from above of a food processing apparatus of the invention.

Referring to the drawings, and initially to FIG. 1 there is illustrated a food processing apparatus 1 for the processing and dispensing of deep fried food products. The apparatus 1 includes a rectangular box cabinet 2 having a pair of front doors 3 and 4 which are illustrated in the open position. Various dispensing devices are mounted on the inside of the doors 3 and 4. The cabinet 2 includes an upper refrigerated compartment 5 having a batch dispensing system. The batch dispensing system communicates with an intermediate cooking compartment 6 and there is a lower compartment 7 containing various processing equipment. A programmable microprocessor control unit 8 is mounted in the cooking compartment 6 for control of the apparatus 1.

The batch dispensing system includes a hopper 10 positioned over a conveyor 11 arranged to discharge into a weigh mechanism 12. The weigh mechanism 12 is arranged to discharge food products such as french fries or chicken pieces into a cooking chamber 13 having a pivotally mounted cooking basket, not shown in FIG. 1, controlled by a motor 14. The cooking chamber 13 has an outlet 15. In this view, a container 16 for fume extraction liquid, an oil reservoir 18 and a refrigeration compressor 19 are visible in the lower compartment 7. For clarity, connecting tubes and smaller devices such as pumps and valves are not illustrated.

The door 3 includes a container dispensing system comprising a chute 22 which receives containers from a stack mechanism 23. The stack mechanism 23 comprises a centre column 24 and a pair of side columns biased inwardly by resilient guides 25. The centre column 24 is semi-circular in plan view and is rotatable by a motor 26. The containers in the side columns are pushed inwardly in turn according to rotation of the centre column 24 when the containers in the centre column 24 have been used up. The container dispensing system also includes a stripper unit 28 which includes a cam arrangement for holding the containers, in this case cups, by their rims while french fries or other food products are discharged from the cooking chamber outlet 15. When the food has been discharged, the stripper unit 28 drops the container which is delivered to a user via the chute 22. A hatch door, not shown, at the base of the chute 22 is opened when a container is being delivered.

The door 4 includes two turrets 30 and 31 for holding sachets of food such as ketchup or mayonnaise. The turrets 30 and 31 are operated by servo motors 32 and 33 which are arranged to turn the turrets through steps of 120°. Each step aligns a column with an exit hole in the door 4 through which the sachet is pushed by a cam into a hatch, not shown. A salt dispenser 35 is also located in the door 4. The door 4 also includes a coin reception device 36.

Figure 2:
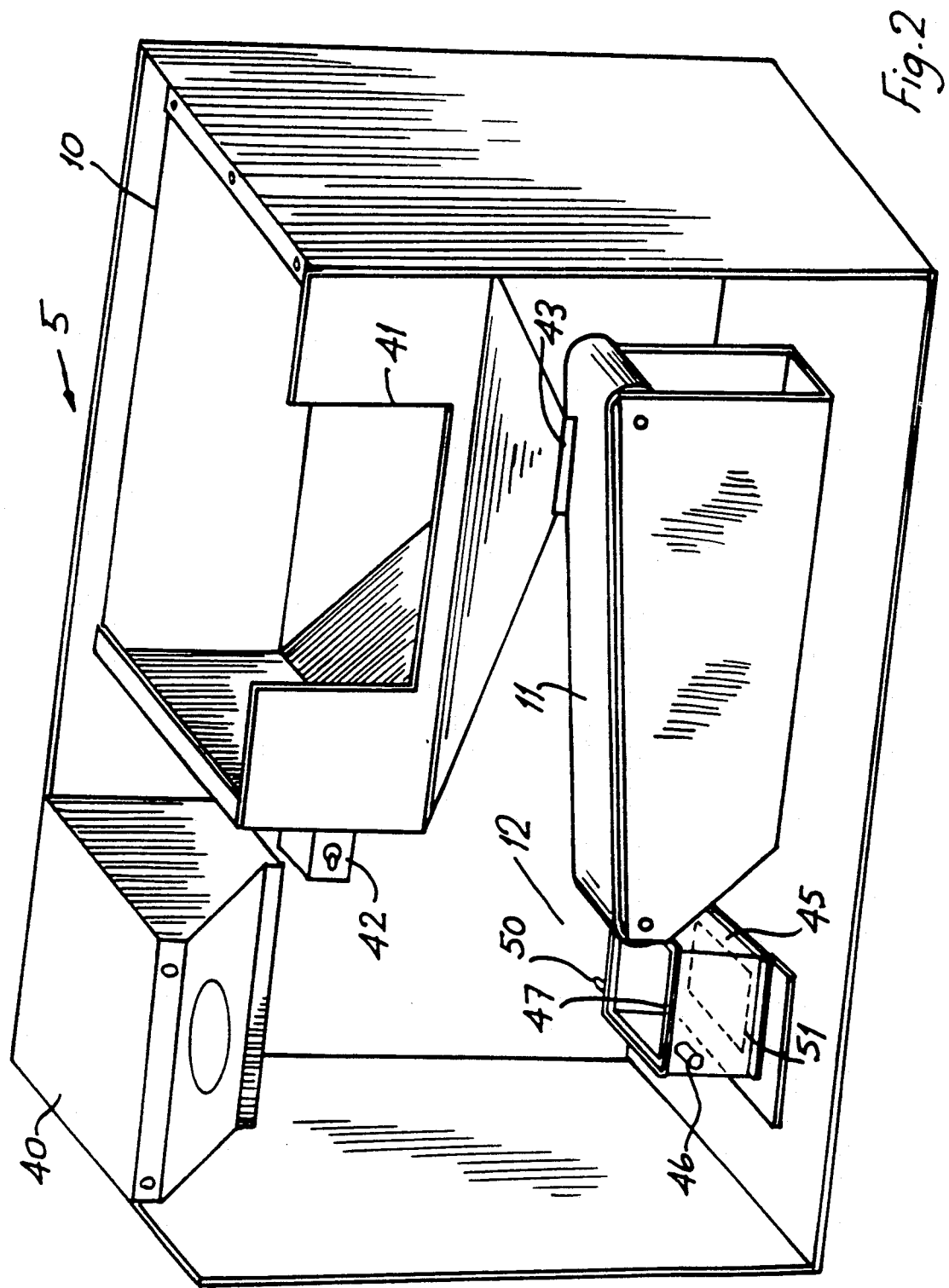
FIG. 2 is a perspective view of a refrigerated compartment of the apparatus.

Referring now to FIG. 2, the refrigerated compartment 5 includes a cooling fan 40 which is connected to the compressor 19 for refrigeration. The hopper 10 includes an inlet opening 41, and a vibratory motor 42 is secured to one side for vibration of the hopper 10, in use. A hopper outlet 43 is positioned over the upper end of the conveyor 11 which discharges into the weigh mechanism 12. The weigh mechanism 12 comprises a rectangular support frame 45 on which is mounted a motor 46 and a pivoted container 47. The container 47 is mounted on a pivot shaft 50 which is the output shaft of the motor 46. A rotary encoder comprising a variable resistance rotary analogue transducer connected to an analogue to digital converter is mounted at the motor 46 for continuously determining the rotational position of the output shaft 50. Such a transducer and converter arrangement is hereinafter referred to as a "rotary encoder". The container 47 is mounted over a rectangular opening 51 in the cabinet shelf through which food products are dropped from the container 47 when the latter is at a lower, discharge position.

In operation, frozen food is loaded into the vibrating hopper 10 and the food drops onto the conveyor 11 which delivers it to the container 47. The control unit 8 is programmed to stop operation of the conveyor 11 when a pre-set weight of food particles in the container 47 is reached upon which the motor 46 is activated to rotate the container 47 from a reception position as illustrated in FIG. 2 to a batch delivery position at which the food drops out of the container 47. After a pre-set time, the motor 46 is activated to return the container 47 to the reception position. The control unit 8 is programmed to output an out-of-stock signal if the pre-set weight is not reached after a pre-determined time period. It will be seen that the frame 45 and the container 47 together form a cover for the refrigerated compartment over the opening 51, which prevents warm air, fumes or oil splashes from entering the compartment. This causes improved hygiene and compressor efficiency.

When in the reception position, the motor 46 is activated to hold the container 47 against the turning moment caused by the weight of the food. This turning moment, however, causes slight tilting of the container 47, which tilting is detected by the rotary encoder. The control unit 8 is calibrated with food weight corresponding to the degree of tilting. The control unit is also programmed with the desired weight. It will thus be appreciated that variable control is achieved by simply inputting parameters into the control unit 8.

Figure 3:
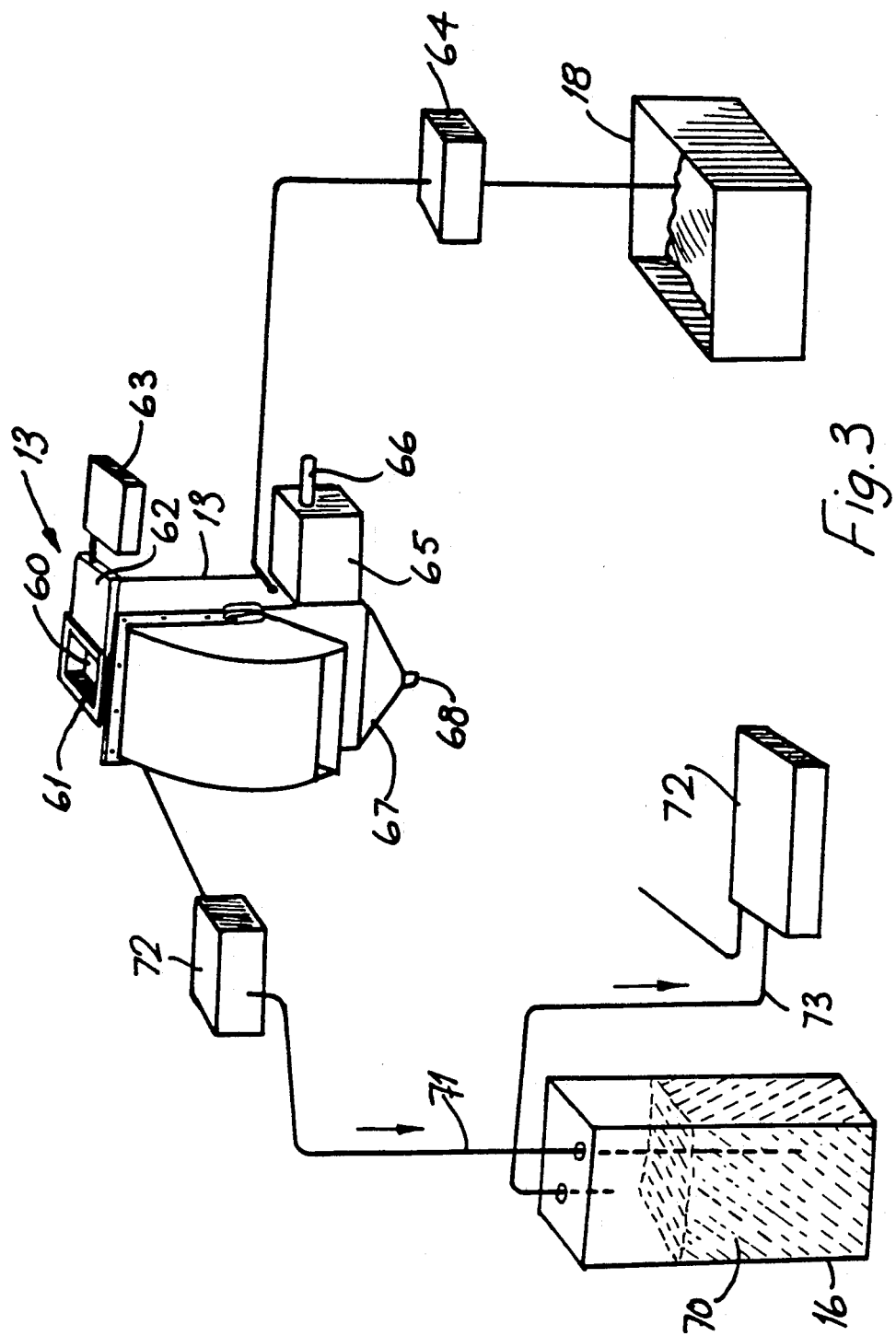
FIG. 3 is a diagrammatic representation of oil top-up and fume extraction systems forming part of the apparatus.

Referring now to FIG. 3, the cooking chamber 13 and the associated oil top-up, fume extraction and oil filtration systems are illustrated. The cooking chamber 13 includes an inlet opening 60, the rim of which is formed by a silicone heat barrier 61. A sliding door 62 operated by a motor 63 via a cam mechanism is mounted at the inlet opening 60. In FIG. 3, the sliding door 62 is illustrated in the open position. The oil top-up system includes a pump 64 arranged to deliver oil to the cooking chamber 13 from the oil reservoir 18. Oil level in the chamber 13 is monitored by a float assembly 65, the float of which is mounted on a pivot shaft. The degree of rotation of the pivot shaft is determined by a rotary encoder 66.

Filtration of the oil is achieved in a simple and effective manner by the arrangement of the cooking chamber 13. The lower portion of the chamber 13 forms a V-shaped sump 67 below the level of the oil heating elements, not shown. Because heat rises from the elements, oil in the sump 67 is at a lower temperature with the result that "heavier" oil and deposits tend to gather in the sump 67. A drain valve 68 is provided for draining of the sump 67 at regular intervals. In this embodiment, the drain valve 68 is manually operated, however, it is envisaged that it may be automatically operated by the control unit 8.

The fume extraction system comprises the container 16 which holds a quantity of fume extraction liquid 70. A tube 71 delivers fumes from the chamber 13 to below the surface of the extraction liquid 70. Air over the liquid 70 is delivered to the atmosphere by a tube 73. Vacuum pumps 72 are used to draw the fumes and air. In this embodiment, the fume extraction liquid 70 comprises a mixture of 90% water and 10% citric acid. In operation, the oil in the fumes condenses and the citric acid acts on the oil, both condensed and non-condensed to break it down into solid particles which are deposited on the bottom of the container 16. The resultant filtered fumes are extracted from the container 16 above the level of the liquid 70.

Referring now to FIG. 4, the cooking chamber 13 is illustrated in more detail. The chamber 13 includes a casing having a rectangular box portion 75 which holds cooking oil 76 and a curved portion 77 leading to the discharge opening 15. A basket 80 in the shape of a quadrant in side view, with an integral extending barrier member, in this case a chute 81 is mounted on a pivot shaft 82 which is operated by the motor 14. A rotary encoder is mounted on the shaft 82 at the motor 14, which controls rotation of the pivot shaft 82 under the control of the control unit 8. In use, the basket 80 turns to a cook position as illustrated in FIG. 4(a) at which food particles contained in the basket 80 are immersed in the oil 76. The oil temperature and the cooking time may be readily pre-set at the control unit 8. For example, for french fires the oil is generally at 185° C. and the cooking time is typically thirty-four seconds. When cooking is completed, the motor 14 rotates the basket 80 to a drain position above the oil 76 as illustrated in FIG. 4(b). The drain position may be at any desired angle because the transducer is of the analogue type and continuous control is achieved. In this embodiment the motor 14 oscillates the basket 80 back-and-forth at the drain position to shake oil from the food. Again, drain time and basket movement may be easily set at the control unit 8. The motor 14 then rotates the basket 80 through approximately 45° to a discharge position as illustrated in FIG. 4(c). At the discharge position, cooked food particles are delivered down the chute 81 and out of the outlet 15.

The curved casing portion 77 coincides with the path of rotation of the outer end of the chute 81 and so the chute 81 acts as a barrier between oil in the chamber 13 and the discharge outlet 15 until the discharge position is reached. The chute 81 and the casing are manufactured to a high precision so that there is a minimal gap between the edges. Thus, the chamber is effectively sealed and pressure increases during cooking. This results in quick, efficient and odourless cooking. This is a very important aspect of the invention as heretofore relatively long cooking times, especially for larger food pieces such as chicken pieces, and emission of odorous fumes are the major disadvantages of presently available apparatus. Almost all fumes generated are cleansed by the fume extraction system.

It will thus be appreciated that the invention provides an apparatus which in an efficient and quick manner automates food processing and dispensing without emission of odorous fumes. Co-ordination of the various portions of the apparatus is achieved by the use of a central control unit 8 to which all of the various motors, sensors and displacement transducers are connected.

Further, versatility is achieved because to change various parameters it is only necessary to re-program the control unit 8. This is particularly important when it is desired to change from cooking one type of food to another.

It will be appreciated that the use of analogue resistive transducers which operate continuously over a range is advantageous as continuous monitoring and control of the moving parts is achieved. It is envisaged, however, that other types of analogue transducers such as those of the capacitance or inductance types may be used. Digital transducers such as photoelectric detectors may also be used provided there is a sufficiently large number of discrete readings to provide near-continuous control.

We claim:

1. A food processing apparatus comprising:
   a central control unit;
   a refrigerated compartment including a batch dispensing system operatively connected to the control unit for automatic dispensing batches of food from the refrigerated compartment;
   a cooking compartment including a deep-fry cooking chamber comprising:
   a casing;
   an oil heating means;
   a reception opening in the casing for reception of batches of frozen food from the refrigerated compartment;
   door means operated by a drive means operatively connected to the control unit for covering the reception opening except when a batch of food is being received;
   a food basket mounted in the casing;
   drive means for moving the basket between a cooking position in which at least portion of the basket is immersed in oil for cooking and a discharge position for delivery of food from the basket through a discharge outlet in the casing;
   barrier means for the discharge outlet in the casing, the barrier means being movable from a closed position for substantially sealing the casing discharge outlet during cooking and an open position to allow discharge of food from the basket through the casing discharge outlet when the basket is in the discharge position; and
   a container dispensing mechanism operatively connected to the control unit for automatically dispensing a container for reception of the discharged cooked food.

2. A food processing apparatus as claimed in claim 1 in which the barrier means moves with the basket as the basket moves between the cooking and discharging positions.

3. A food processing apparatus as claimed in claim 1 wherein the basket is pivotally mounted in the casing and the barrier means comprises a plate member, the plate member extending between walls of the casing between the oil and the discharge opening when the basket is in the cooking position and being disposed at the opposite side of the discharge opening when the basket is at the discharge position.

4. A food processing apparatus as claimed in claim 3 wherein the casing walls are curved to coincide with the path of the plate member so that the plate member seals the cooking chamber at all positions of the basket except the discharge position.

5. A food processing apparatus as claimed in claim 1 wherein the cooking chamber further comprises detection means connected to the control unit for detection of basket position, and the control unit comprises means for directing the drive means to move the basket to any desired position between the cooking and discharge positions.

6. A food processing apparatus as claimed in claim 5 wherein the basket is pivotally mounted and the control unit comprises means for directing the drive means to oscillate the basket at a drain position above the oil intermediate the cooking and discharge positions.

7. A food processing apparatus as claimed in claim 1 wherein the casing walls at a lower end of the cooking chamber are directed downwardly and inwardly to form a sump below the level of the heating means so that oil in the sump is at a lower temperature than oil above the heating means to facilitate collection of deposits, the sump having a drain valve for draining of deposits.

8. A food processing apparatus as claimed in claim 1 wherein the batch dispensing system comprises a hopper mounted above a conveyor arranged to discharge into a weigh mechanism, the weigh mechanism comprising:
   a weigh container mounted on a pivot shaft;
   a motor driving the pivot shaft, said motor being connected to the control unit; and
   a detection means connected to the control unit for detection of pivot shaft rotary position, wherein the control unit comprises means for monitoring relatively small degrees of tilt of the weigh container caused by weight of food in the container, said tilt being proportional to said food weight, the control unit further comprising means to direct the motor to rotate the container to a lower dump position when a pre-set weight is reached.

9. A food processing apparatus as claimed in claim 1 further comprising a fume extraction system comprising a pump for withdrawal of fumes from the cooking chamber through a fume extraction liquid and delivery of resulting cleansed fumes to the exterior of the food processing apparatus.

10. A food processing apparatus as claimed in claim 9 wherein said fume extraction liquid comprises approximately 90% by volume of water and 10% by volume of citric acid.

* * * * *